Feb. 22, 1966   H. M. McKAY   3,236,501
LANDING GEAR FOR TRAILERS
Filed July 15, 1963   2 Sheets-Sheet 2

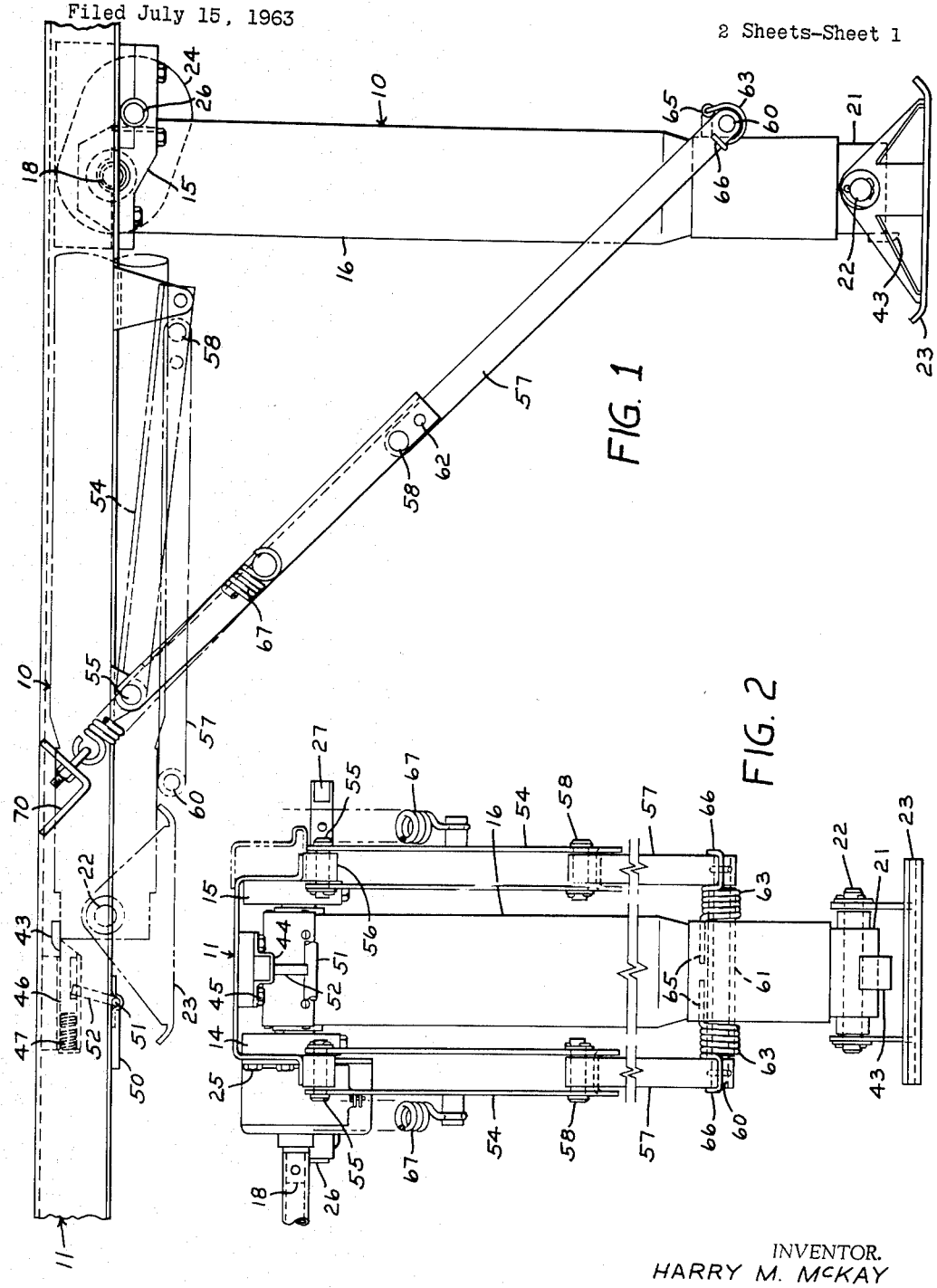

INVENTOR.
HARRY M. McKAY
BY Cohn and Powell

United States Patent Office 3,236,501
Patented Feb. 22, 1966

3,236,501
LANDING GEAR FOR TRAILERS
Harry M. McKay, Warrenton, Mo., assignor to The Binkley Company, Warrenton, Mo., a corporation of Missouri
Filed July 15, 1963, Ser. No. 294,973
4 Claims. (Cl. 254—86)

This invention relates generally to improvements in a landing gear for trailers, and more particularly to an improved double-retractable landing gear.

It is an important object of the present invention to realize a landing gear that is quickly and easily retracted or extended, and one which provides a considerable ground clearance when disposed in the retracted and folded position.

Another important objective is achieved by the provision of a rotatable mechanism that operates to retract a leg section telescopically with respect to another leg section in moving the ground-engaging means off the ground, and then automatically operates upon continued turning in the same direction to fold the entire leg upwardly to a fully retracted position.

An important object is realized by the provision of an elongate substantially U-shaped, inverted channel attached to the trailer in which the uppermost leg section is pivotally mounted so that the leg swings to a downwardly extended position or to an upwardly folded position within the channel, and by the provision of a drive shaft rotatively mounted coaxially with the axis of the pivotal mounting of such leg which is operatively interconnected by gearing to the telescopically interfitted leg sections for extending and retracting the leg sections. Means is provided for restraining relative rotation of the gears in the telescopically retracted position of the leg sections upon turning of the drive shaft in one direction so that upon continued turning in the same direction the leg is swung bodily to a folded position.

Still another important object is to provide a latch means that is fixed within the inverted U-shaped channel, the latch means being selectively engageable with the leg to hold the leg in the folded position within the channel.

An important objective is achieved by the provision of a gear box attached to the trailer having a housing in which gearing operatively interconnects a crankshaft rotatively mounted in the housing with the drive shaft extending into the uppermost leg section coaxially with the axis about which the leg swings, the crankshaft extending through the housing and across the leg, the axis of the crankshaft being located out of the path of the swinging leg.

Another important object is afforded by the provision of a toggle including a pair of pivotally connected link members, one of the link members being pivotally connected to the leg while the other is pivotally connected to the trailer, and by the provision of a torsion spring about the pivot connection of the one link member to the leg, the torsion spring interconnecting the leg and the one link member and tending to urge the one link member in a direction to break the toggle to enable folding of the leg.

Yet another important objective is achieved by the provision of a tension spring interconnecting the trailer with one of the link members so that the line of force is offset relative to the pivotal connection of the link members so that the tension spring tends to fold the toggle after it is initially broken by the torsion spring, thereby providing an assist in lifting the leg from its downward position to its upwardly folded position.

An important objective is realized by providing a landing gear that is simple and durable in construction, economical to manufacture and install, and which is easily and quickly operated by any one without requiring any complicated instructions.

The foregoing and numerous other objects and advantages of the invention will more clearly appear from the following detailed description of a preferred embodiment, particularly when considered in connection with the accompanying drawings in which:

FIG. 1 is a rear elevational view of the landing gear shown in its telescopically retracted, yet down position;

FIG. 2 is a side elevational view as seen from the right of FIG. 1, the leg being shown in its upwardly folded position by broken lines;

Figure 3:
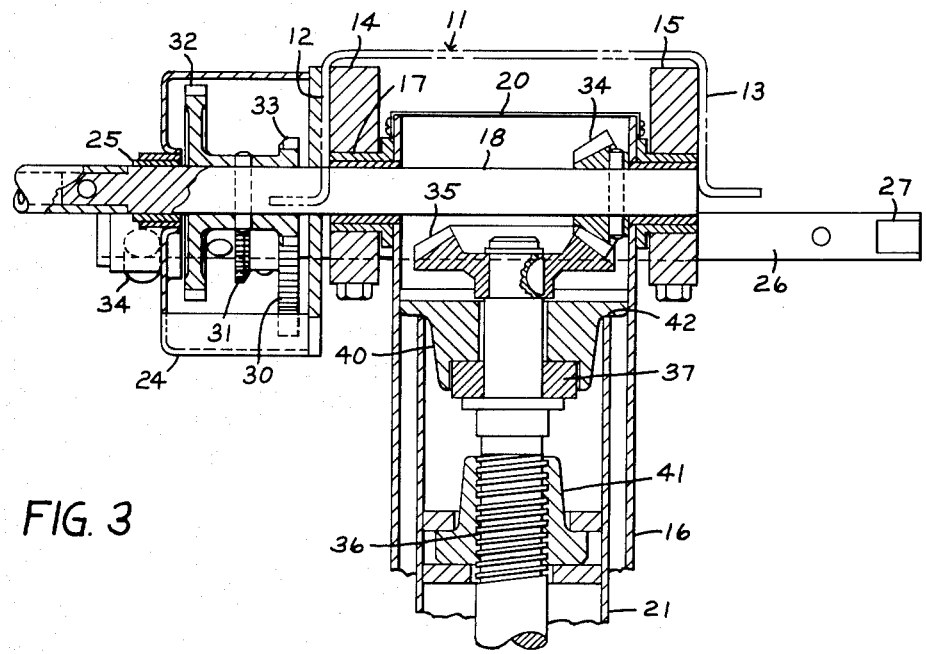
FIG. 3 is a cross sectional view of the landing gear as seen in a vertical plane passed through its pivot axis.
Figure 4:
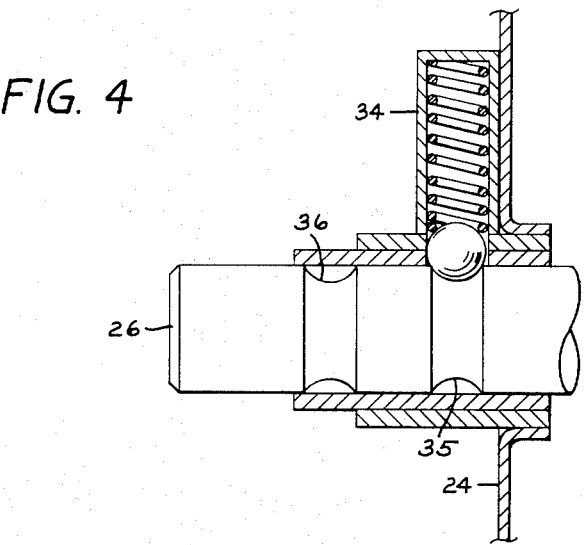
FIG. 4 is an enlarged cross sectional view of the locking mechanism for the shifting crankshaft.

Referring now by characters of reference to the drawings, the landing gear is adapted to be operatively attached to any trailer, and is adapted to support one end of the trailer after detachment from the tractor.

The landing gear includes a pair of supporting legs generally indicated at 10 on opposite sides of the trailer frame, as is shown in U.S. Patent No. 2,977,094. Each trailer frame-supporting leg is identical in structure so that the detailed description of one such leg will suffice for the other.

Attached to the bottom at each side of the trailer body is an elongate, substantially U-shaped, inverted channel 11 having spaced depending side walls 12 and 13. A pair of bearing blocks 14 and 15 are secured within the channel 11, one block 14 being fastened to the channel side wall 12 while the other bearing block 15 is secured to the opposite channel side wall 13.

Each supporting leg 10 includes a tubular leg section 16 hingedly mounted by bearing elements 17 in the bearing blocks 14 and 15 and on a drive shaft 18. It will be understood that the axis of the drive shaft 18 is coaxial with the axis of the pivotal mounting of the leg section 16. The leg section 16 is closed by plate 20 at its upper end and is open at its lower end to receive telescopically therein an adjustable tubular leg section 21.

Pivotally attached to the lower end of adjustable leg section 21 by pivot bolt 22 is a foot plate 23 constituting a ground-engaging means. Obviously, the pivotal mounting of foot plate 23 enables the plate to conform and adapt to uneven or inclined ground surfaces and contours.

A gear box having a housing 24 is secured to the outside of the one channel side wall 12 by a plurality of bolt and nut connections 25. The housing 24 is located inwardly of the channel 11 away from the curb side of the trailer. It will be noted that the drive shaft 18 extends through the bearing block 14, through the channel side wall 12 and into the housing 24, the drive shaft 18 being rotatively mounted by bearing member 25 within the housing 24. The drive shaft 18 extends through and out of the housing 24 for attachment to a cross shaft (not shown) that interconnects the drive shafts of the pair of coacting legs. The opposite end of the drive shaft is terminated short of the opposite channel side wall 13. The gear box housing 24 is securely fastened in this manner to the trailer body.

A crankshaft 26 extends through and is rotatively mounted in the bearing blocks 14 and 15 and in the housing 24. One end of the crankshaft 26 is provided with a formation 27 that is adapted for attachment selectively to a crank (not shown) for turning the crankshaft. The crankshaft 26 is disposed below the channel 11 and extends transversely of the leg 10 forwardly of such leg in its downwardly extended position shown in FIG. 2. In other words, the crankshaft 26 is located out of the path of the swinging movement of the leg 10.

Gearing located within the gear box housing 24 operatively interconnects the crankshaft 26 with the drive shaft 18. Specifically, a double gear member consisting of a large gear 30 and a smaller gear 31 is drivingly attached and rotatable with the crankshaft 26, while a similar double gear member including a large gear 32 and a smaller gear 33 is drivingly attached and rotatable with the drive shaft 18. The crankshaft 26 is shiftable between limits along its longitudinal axis in order to bring the large gear 30 into meshing engagement with the small gear 33 or bring the small gear 31 into meshing engagement with the large gear 32. These limits are defined by engagement of a spring pressed plunger 34 selectively in one of two annular grooves 35 and 36.

A bevel gear 34 is drivingly connected to drive shaft 18 and is located within the tubular casing of leg section 16 (FIG. 3). The bevel gear 34 meshes with a coacting bevel gear 35 fixed to the upper end of a threaded screw shaft 36. The screw shaft 36 is located internally of the leg section 21 and extends along its longitudinal axis which is transverse to the axis of the drive shaft 18. The upper end of screw shaft 36 extends above the upper end of leg section 21 and is mounted for rotation in a bearing 37 fixed by member 40 internally to the leg section 16. Fixed internally to tubular leg section 21 is a nut 41 that threadedly engages the screw shaft 36. The particular configuration of the tubular casings comprising leg sections 16 and 21 preclude relative rotation of such leg sections and permit telescopic adjustment of leg section 21 through the open lower end of leg section 16. As is apparent, upon rotation of the drive shaft 18, bevel gears 34–35 and screw shaft 36, the nut 41 will travel along screw shaft 36 and hence cause telescopic adjustment of leg section 21.

It will be importantly noted that when the leg section 21 is fully retracted within the leg section 16, the upper end 42 of the leg section 21 engages the fixed internal member 40 which precludes rotation of the screw shaft 36 in the same direction, and consequently precludes any further relative rotation of the bevel gears 34 and 35. The purpose and functional advantage of this structural arrangement will be described in detail upon later description of parts.

A latch means is utilized to retain the leg 10 in its upwardly folded position illustrated in broken lines in FIG. 2. This latch means includes a keeper 43 that is attached to and extends below the bottom end of the leg section 21. A bolt housing 44 including a substantially U-shaped channel structure is secured to the underside of the inverted elongate frame channel 11 and within the channel side walls 12 and 13 by bolts 45. Slidably disposed within the housing channel 44 is a bolt 46 having a beveled forward end. A compression spring 47 is located within the latch housing 44 and engages the bolt 46 tending to urge the bolt 46 outwardly so that it is in the path of the keeper 43 as the leg 10 is folded upwardly within the frame channel 11.

A handle 50 is hingedly connected by straps 51 to the side walls 12 and 13 of channel 11, the handle 50 including an upstanding finger 52 engageable with the sliding bolt 46. The finger 52 is located within and between the channel side walls 12 and 13. The handle 50 includes a hand grip portion that abuts and lies flush with the lower margins of the channel side walls 12 and 13 when the slide bolt 46 is disposed in its forwardly extended position. Upon pivoting the handle 50 down and counterclockwise (FIG. 2), the finger 52 moves the bolt 46 rearwardly against the loading of spring 47 to release the bolt 46 from the catch 43.

A toggle generally indicated at 53 is disposed at each side of the leg 10 which operatively interconnects the leg with the trailer body. Each of the toggles 53 is of the identical constructions so that a detailed description of one will suffice for the other.

The toggle 53 includes a first link member 54 of substantially elongate U-shaped section, one end of the link member 54 being pivotally connected by pin 55 to a bearing bracket 56 mounted on the lower margin of channel side wall 12 or 13. A second elongated link member 57 of substantially U-shaped section has one end pivoted to the opposite end of link member 54 by pin 58, while the opposite end of the second link member 57 is pivotally mounted to the upper leg section 16 by a transverse pivot pin 60. It will be noted that the lower ends of the second link member 57 of the toggles 53 are hingedly connected to the opposite ends of the same pivot pin 60. The pivot pin 60 is carried by a sleeve 61 attached to the upper leg section 16.

When the toggles 53 are disposed in their extended position as shown in FIG. 2, and are disposed in a slightly overcenter position to lock the leg 10 in place, the overlapping interconnected end portions of the link members 54 and 57 of at least one toggle are detachably secured in place by a lock pin 62 that precludes the toggles 53 from breaking or folding unintentionally or accidentally. To fold the toggles 53, the lock pin 62 must be first removed.

A pair of torsion springs 63 operatively interconnect the leg 10 with the toggles 53. More particularly, the torsion springs 63 are located about the ends of the transverse pivot pin sleeve 61, one such torsion spring 63 being disposed between each side of the leg and one associated toggle 53. Each torsion spring 63 has one end 64 retained in a tube 65 that is fixed to the upper leg section 16 while the opposite end 66 engages and bears against the second link member 57 of the associated toggle 53. The torsion springs 63 urge the second link members 57 in a clockwise direction (FIG. 2) tending to break the toggles 53, and thereby enable folding of the toggles 53 and upward swinging movement of the leg 10. The purpose of the torsion springs 63 is to break the toggles 53 automatically when the lock pin 62 is removed and the ground-engaging foot 23 is raised to release the leg 10.

A pair of tension springs 67 operatively interconnect the toggles 53 with the trailer body. Specifically, each tension spring 67 is connected at one end to a bracket 70 fixed to the underside of the trailer body, while the opposite end is fixed to the upper link member 54. It will be importantly noted that the line of force provided by each tension spring 67 is offset from the pivot pin 58 interconnecting the link members 54 and 57 in a direction so that the tensional force of the springs 67 tend to fold the toggles 53 automatically when they are broken by the torsion springs 63, thereby providing an assist in lifting the leg 10 in its initial movement upwardly about the hinge axis defined by drive shaft 18.

It is thought that the operation and functional advantages of the landing gear have become fully apparent from the foregoing detailed description of parts, but for completeness of disclosure, the usage will be briefly described. It will be assumed that the landing gear is extended as shown by full lines in FIG. 2 to a position in which the leg 10 supports the trailer, and that it is desired to retract and fold this landing gear.

The retracting action is accomplished by turning the crankshaft 26, which in turn rotates the drive shaft 18 through the gear train 30–33 or 31–32. Upon turning of the drive shaft 18, the screw shaft 36 is turned through the meshing action of bevel gears 34 and 35, the nut 41 traveling upwardly along the screw shaft 36 and carrying the lower leg section 21 upwardly within the upper leg section 16.

It will be assumed that the lock pin 62 has been removed from its associated toggle 53 so that when the ground-engaging means 23 disengages from the ground upon retraction of the lower leg section 21, the torsion springs 63 act to break the toggle joint, and hence allowing the tension springs 67 to collapse the toggle 53 partially whereby to pivot the leg pin slightly about the hinge axis defined by the drive shaft 18.

When the lower leg section 21 is fully retracted, the upper end 42 abuts the internal member 40, thereby precluding any further rotation of the screw shaft 36. Consequently, it will be understood that the bevel gears 34 and 35 cannot have any further relative meshing movement. Upon continued turning of the crankshaft 26 in the same direction, and hence upon continued rotation of the drive shaft 18 in the same direction, the bevel gear 34 acts through the bevel gear 35 to swing the bevel gear 35, and as a result to swing the entire leg 10, bodily about the axis of the drive shaft 18 until the leg is folded within the frame channel 11 as is disclosed in broken lines in FIG. 2.

As the leg 10 moves upwardly to a position within the frame channel 11, the keeper 43 will engage and automatically retract the lock bolt 46. When the keeper 43 clears the bolt 46, the latch spring 47 will urge the bolt 46 forward to a position in front of the keeper 43 in order to lock the leg 10 in the folded position.

When it is desired to lower the landing gear, the latch handle 50 is swung to release the bolt 46 from the keeper 43. Then, the crankshaft 26 is turned in the opposite direction so that the bevel gear 43 swings the bevel gear 35 and hence the entire leg 11 bodily downward about the axis of drive shaft 18 until the leg assumes the substantially vertical supporting position illustrated in full lines in FIG. 2. Upon continued rotation of the crankshaft 26 in the same opposite direction, the bevel gear 34 will operate through bevel gear 35 to turn the screw shaft 36 in order to extend the lower leg section 21 until the foot plate 23 engages the ground. Again, it will be noted that extension of the supporting leg 10 is accomplished by a continuous rotation of the drive shaft 18 in one direction. Then, the locking pin 62 can be inserted through the toggle 53 to lock the leg 10 in place.

Although the invention has been described by making detailed reference to a single preferred embodiment, such detail is to be understood in an instructive, rather than in any restrictive sense, many variants being possible within the scope of the claims hereunto appended.

I claim as my invention:

1. A landing gear for trailers comprising:
(a) a supporting leg including a first leg section and an adjustable second leg section telescopically interfitted with the first leg section,
(b) means pivotally mounting the first leg section to the trailer on a transverse axis so that the leg swings to a downwardly extended position or to a folded position,
(c) a drive shaft rotatively mounted coaxially with the axis of the pivotal mounting means,
(d) a first gear mounted on the drive shaft,
(e) means including a second gear meshing with the first gear and mounted to the leg for rotation on an axis transverse to the drive shaft axis, the last said means extending or retracting the leg sections,
(f) means restraining relative rotation of the gears in the retracted position of the leg sections upon turning of the first gear in one direction so that upon continued turning in the same direction the second gear is swung about the drive shaft axis and hence the leg is swung to a folded position,
(g) a gear box attached to the trailer inwardly of the leg, the gear box including a housing,
(h) a crankshaft rotatively mounted in the housing, the crankshaft extending through the housing and across the leg and forwardly of the leg in its downwardly extended position to one side of the trailer, the axis of the crankshaft being located out of the path of the leg during swinging movement, and
(i) gearing operatively interconnecting the crankshaft and the drive shaft.

2. A landing gear for trailers comprising:
(a) a supporting leg including a first leg section and an adjustable second leg section telescopically interfitted with the first leg section,
(b) an elongate, substantially, U-shaped, inverted channel attached to the trailer,
(c) means pivotally mounting the first leg section within the inverted U-shaped channel on a transverse axis so that the leg swings to a downwardly extended position or to a folded position within the channel,
(d) a drive shaft rotatively mounted coaxially with the axis of the pivotal mounting means,
(e) a first gear mounted on the drive shaft,
(f) means including a second gear meshing with the first gear and mounted to the leg for rotation on an axis transverse to the drive shaft axis, the last said means operatively extending or retracting the leg sections,
(g) means restraining relative rotation of the gears in the retracted position of the leg sections upon turning of the first gear in one direction so that upon continued turning in the same direction the second gear is swung about the drive shaft axis and hence the leg is swung to a folded position,
(h) a gear box attached to the trailer including a housing,
(i) a crankshaft rotatively mounted in the housing, the crankshaft extending through the housing and across the leg forwardly of the leg in its downwardly extended position for access at one side of the trailer, the axis of the crankshaft being located out of the path of the swinging leg, and
(j) gearing operatively interconnecting the crankshaft and the drive shaft.

3. A landing gear for trailers comprising:
(a) a supporting leg including a first leg section and an adjustable second leg section telescopically interfitted with the first leg section,
(b) an elongate substantially U-shaped, inverted channel attached to the trailer, said channel having depending laterally spaced side walls, one side wall facing outboard and one side wall facing inboard,
(c) bearing blocks attached to the inside of the spaced side walls of the channel,
(d) means pivotally mounting the first leg section to the bearing blocks and within the channel on a transverse axis so that the leg swings to a downwardly extended position or to a folded position within the channel,
(e) a drive shaft rotatively mounted coaxially with the axis of the pivotal mounting means, the drive shaft extending through the inboard channel wall while stopping short of the opposite outboard channel wall,
(f) a first gear mounted on the drive shaft,
(g) means including a second gear meshing with the first gear and mounted to the leg for rotation on an axis transverse to the drive shaft axis, the last said means extending or retracting the leg sections,
(h) means restraining relative rotation of the gears in the retracted position of the leg sections upon turning of the first gear in one direction so that upon continued turning in the same direction the second gear is swung about the drive shaft axis and hence the leg is swung to a folded position,
(i) a gear box including a housing attached to the inboard channel side wall, the drive shaft extending into and through the housing for connection to a cross shaft,
(j) a crankshaft rotatively mounted in the housing, the crankshaft extending across the leg forwardly of the leg in its downwardly extended position, the crankshaft extending to one side of the trailer for access,
(k) gearing operatively interconnecting the crankshaft and the drive shaft.

4. A landing gear for trailers comprising:
(a) a supporting leg including a first leg section and an adjustable second leg section telescopically interfitted with the first leg section, (b) an elongate, substantially U-shaped inverted channel attached to and extending longitudinally of the trailer, said channel having laterally spaced, depending side walls,
(c) bearing blocks attached to the inside of the spaced side walls of the channel,
(d) means pivotally mounting the first leg section to the bearing blocks and within the inverted U-shaped channel on a transverse axis so that the leg swings to a downwardly extended position or to an upwardly folded position within the channel,
(e) a gear box including a housing fixed to the outside of the inboard channel side wall,
(f) a drive shaft rotatively mounted coaxially with the axis of the pivotal mounting means, the drive shaft extending through the inboard channel side wall and into the housing while stopping short of the opposite outboard channel side wall,
(g) a first bevel gear mounted on and rotatable with the drive shaft,
(h) means including a second bevel gear meshing with the first bevel gear,
(i) a screw shaft fixed to and rotatable with the bevel gear on an axis transverse to the drive shaft axis,
(j) a nut fixed to the second leg section and movable along said screw shaft for extending or retracting the leg sections,
(k) means fixed in first leg section abutting the upper end of the second leg section to restrain relative rotation of the bevel gears in the retracted position of the leg sections upon turning of the first bevel gear in one direction so that upon continued turning of the first bevel gear in the same direction the second bevel gear is swung about the drive shaft axis and hence the leg is swung to a folded position,
(l) a crankshaft rotatively mounted in the housing,
(m) gearing in the housing operatively interconnecting the crankshaft and drive shaft, the crankshaft extending through the housing and across the leg below the channel, the axis on the crankshaft being located forwardly of the leg in its downwardly extended position out of the path of the swinging leg,
(n) a pair of toggles, one toggle on opposite sides of the leg, each toggle comprising a pair of link members pivotally connected together,
(o) a pin attached to and extending across the first leg section, first link members of the pair of toggles being pivotally connected to the ends of the pin,
(p) second link members being pivotally connected to the trailer,
(q) a pair of torsion springs mounted on the ends of the pin, one torsion spring being disposed on each side of the leg, the torsion springs having one end fixed to the first leg section and the other end engageable with the first link members of the toggles, the torsion springs urging the first link members in a direction tending to break the toggles automatically to enable folding of the leg, and
(r) a pair of tension springs interconnecting the trailer with the toggles, the tension springs being connected to the second link members so that the lines of force of the tension springs are offset relative to the pivotal connections of the link members of the toggles so that the tension springs tend to fold the toggles automatically after they are initially broken by the torsion springs.

References Cited by the Examiner

UNITED STATES PATENTS

| | | | |
|---|---|---|---|
| 197,022 | 11/1877 | Eberhart | 108—81 |
| 1,647,921 | 11/1927 | Levinson | 292—173 |
| 2,068,606 | 1/1937 | McPherson | 292—173 |
| 2,977,094 | 3/1961 | McKay | 254—86 |
| 3,081,065 | 3/1963 | Dalton | 254—86 |
| 3,104,891 | 9/1963 | Dalton | 254—86 |

WILLIAM FELDMAN, *Primary Examiner.*

MILTON S. MEHR, *Examiner.*